3,152,241
Patented Oct. 6, 1964

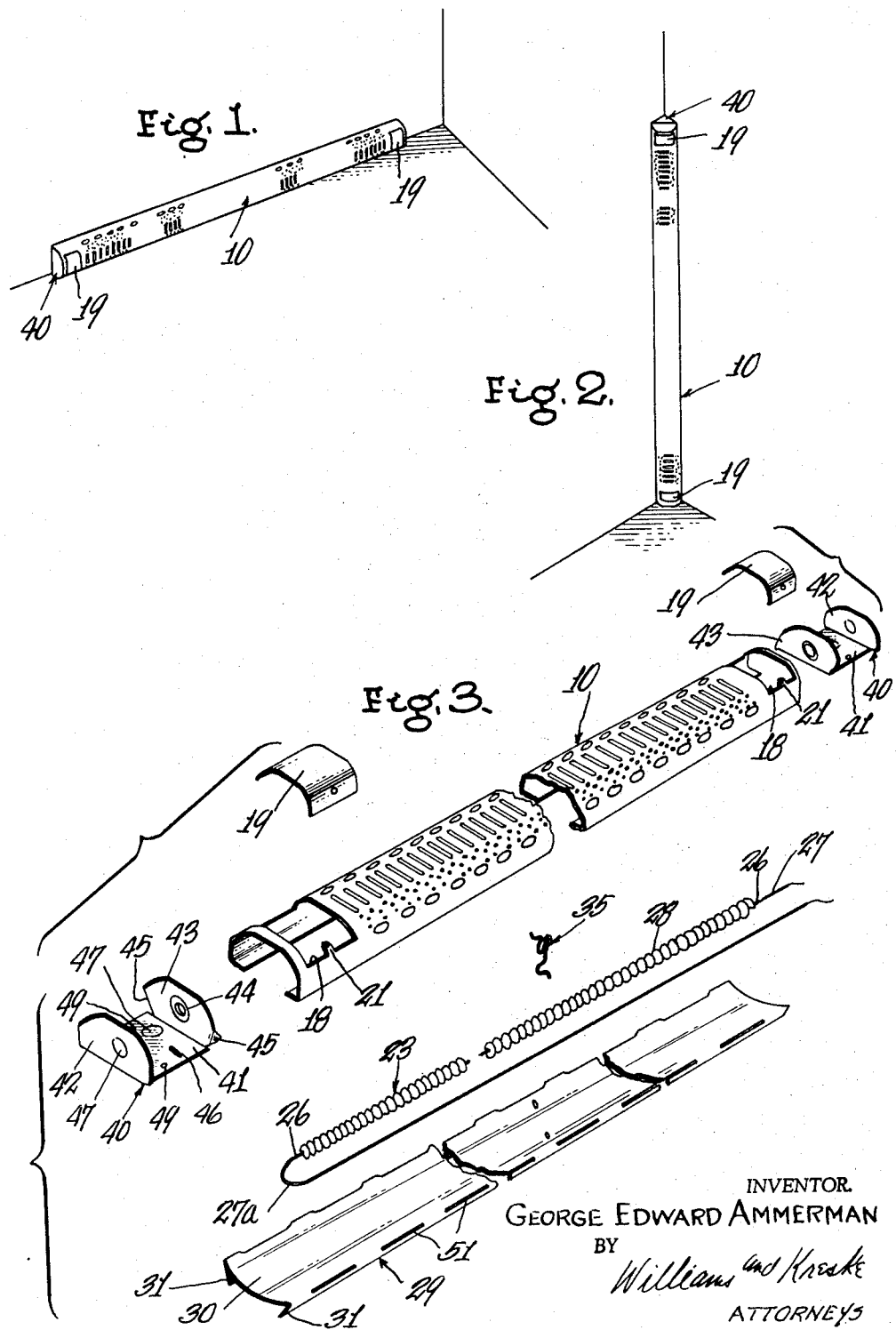

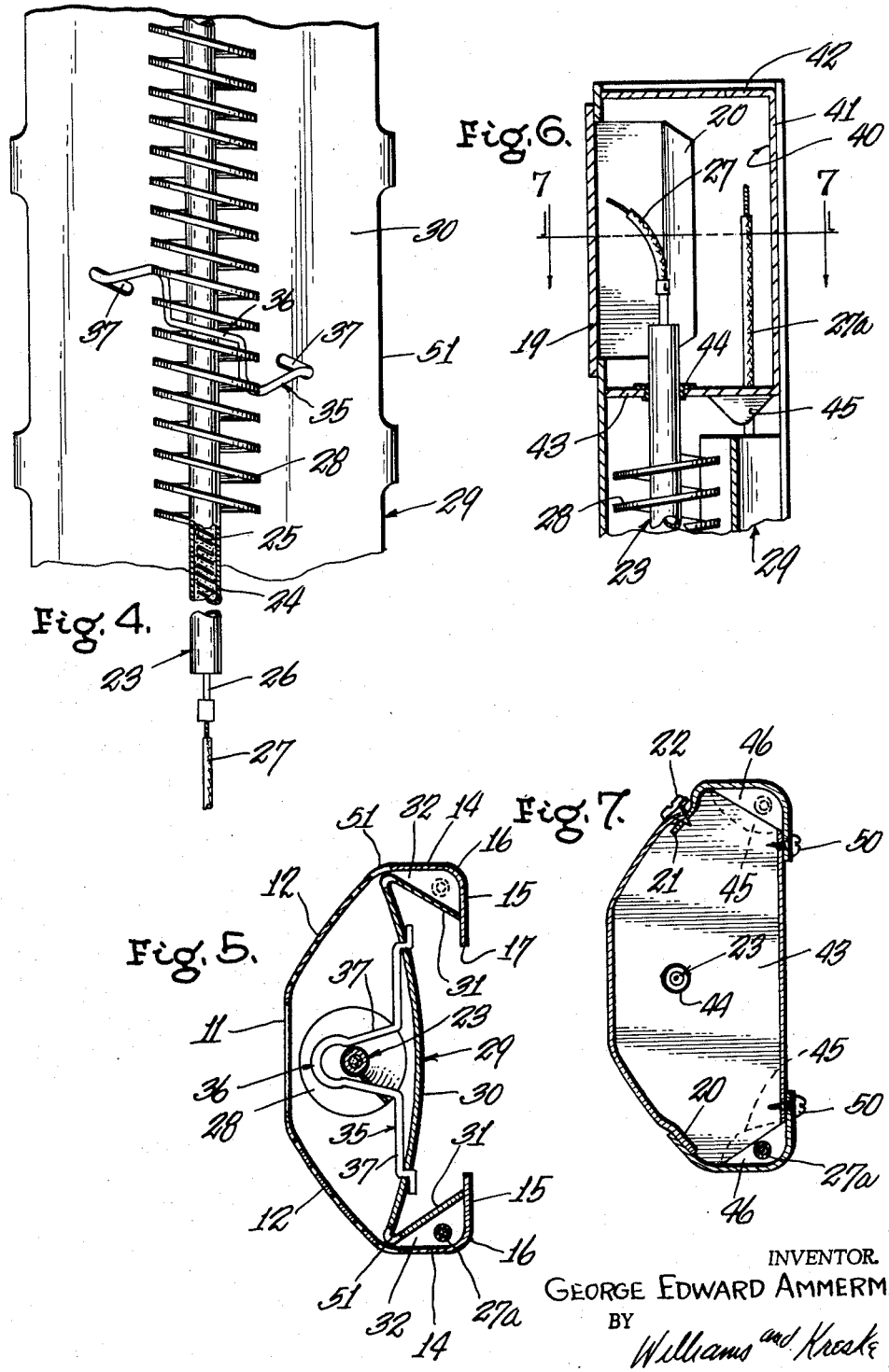

1

3,152,241
ELECTRIC HEATER ASSEMBLIES
George Edward Ammerman, Oakmont, Pa., assignor to Edwin L. Wiegand Company, Pittsburgh, Pa.
Filed Oct. 10, 1962, Ser. No. 229,564
4 Claims. (Cl. 219—342)

This invention relates to electric heater assemblies and the principal object of the invention is to provide new and improved assemblies of this character.

In the drawings accompanying this specification and forming a part of this application, there is shown, for purpose of illustration, an embodiment which my invention may assume, and in these drawings:

FIGURES 1 and 2 are small scale perspective views showing my improved heater in various room heating relations, FIGURE 3 is an exploded perspective view of parts constituting the heater assembly, FIGURE 4 is an enlarged fragmentary plan view of the heater and cover-reflector assembly, FIGURE 5 is an enlarged transverse sectional view through the improved heater, FIGURE 6 is an enlarged fragmentary longitudinal sectional view illustrating an end of the heater, and FIGURE 7 is a transverse sectional view corresponding generally to the line 7—7 of FIGURE 6.

The improved heater is particularly suited as a heat radiator and may be positioned horizontally along the baseboard area of a room as shown in FIGURE 1, or may be positioned vertically at a corner of a room, as shown in FIGURE 2. It will be appreciated that the heater may be otherwise positioned such as at or near the ceiling of a room, and that suitable means, not shown, may be used to hold the heater in desired position.

The embodiment of the invention herein disclosed comprises a casing 10 which is preferably made of sheet-metal, and C-shaped in cross-section as best seen in FIGURES 5 and 7. The casing may be of any desired length and in production several standard lengths may be manufactured. As best seen in FIGURE 3, the casing is open at each end and as also seen in FIGURES 5 and 7, the back side of the casing is open, this opening extending the entire length of the casing in the illustrated embodiment.

The C-shape of the casing 10 provides a generally flat central portion 11, curved or angled continuations 12, 12, opposed marginal portions 14, 14 and inwardly directed terminal portions 15, 15 integrally connected to the marginal portions 14 by curved corners 16. The terminal portions 15 are spaced to form the opening 17 at the back side of the casing. The central portion 11, the continuations 12 and marginal portions 14 are suitably apertured for air flow therethrough. At each end, the casing 10 is formed with front openings 18 for a purpose to be described.

A plate 19 of the same shape as the adjoining part of the casing 10 is adapted to cover each front opening 18. As best seen in FIGURE 7, one end of the plate 19 is formed with an inwardly offset portion 20 to engage behind the lip formed by a marginal portion 14 at the opening 18. The lip at the opposite end of the opening is provided with an apertured tab 21 and a sheet-metal screw 22 extends through an opening in the plate 19 and is threaded into the tab aperture.

An electric heating element 23 is disposed within the hollow of the casing 10 and extends longitudinally with respect thereto. The heating element is preferably of the type comprising a tubular metal sheath 24 which is here shown as rectilinear. A coiled resistance wire 25 is disposed within the sheath and is embedded within highly compacted refractory material to electrically insulate the wire 25 from the sheath and conduct heat from the wire to the sheath, according to well known construction.

Terminal pins 26 extend from opposite ends of the sheath 24, the pins being electrically connected to respective ends of the resistance wire, in known manner, and conductors 27 are mechanically connected to respective terminal pins for the purpose of electrically connecting the resistance wire to a source of electrical current. A metal heat-radiating fin 28 is helically wound around the sheath and extends substantially the length thereof.

A cover 29 is provided for closing the open back side 17 of the casing 10, the cover comprising an elongated rigid member preferably formed of sheet metal. The cover is substantially as long and wide as the back opening and, as best seen in FIGURES 3 and 5, comprises a central portion 30 which is arcuate in cross-section and of a width just lsightly less than the distance between the casing marginal portions 14, 14. The cover 29 also has rearwardly turned marginal wings 31, 31 which angle in a direction toward each other.

In the disclosed embodiment, the cover 29 is slid endwise through an end opening of the casing 10, the parts interfitting as best seen in FIGURE 5 with the curvature of the cover 29 complementing the curvature of the casing to form the hollow in which the heating element is disposed. The cover not only forms the closure for the back of the casing but also serves as a reflector for the heating element to direct heat from the latter outwardly through the openings in the front of the casing. The wings 31, 31 of the cover 29 fit with interior surfaces of the casing at the marginal and terminal portions 14 and 15 to form longitudinally extending pockets 32, 32 which are ideally suited to provide wire-ways for conductors, such as shown in FIGURE 5. In some instances, it is desired to have both electrical connections at one end of the casing and therefore one conductor, such as the conductor 27a (FIGURE 3) may be long and extended through a wireway 32 so as to terminate at the same end as the other conductor 27.

The heating element 23 is carried by the cover 29 and the two are assembled as a unit with the casing 10. Only an intermediate portion of the heating element, herein shown to be the medial portion thereof, is connected to the cover so that the element is free to expand and contract. In the present embodiment, a wire member 35 is utilized to connect the central portion of the heating element to the cover, the member 35 having a loop 36 which fits over the sheath 24 of the element and is inclined, as seen in FIGURE 4, to fit between adjoining convolutions of the heat radiating fin 28 so as to have threading relation therewith. Opposite legs of 37, 37 of the wire member possess sufficient resiliency to maintain the assembly, the terminal portions of such legs being spring-pressed to seating relation within respective openings in the cover. It will be appreciated that the heating element may be adjusted longitudinally of the cover merely by rotating the element, the threading connection between the fin 28 and the wire member 35 providing for such adjustment.

End closures 40 are provided to close the ends of the casing 10 and to complete the assembly. The end closures are usually connected to the casing before the plates 19 are in place but after the cover 29 has been slid to position, although at least one of the closures may be connected before the cover assembly operation.

Each closure is formed as a U-shaped sheet-metal member having a flat bight portion 41 and wing portions 42, 43. The wing portions 42, 43 are shaped complementary to the cross-section of the casing to slidably fit therewithin. The wing portion 43 is adapted for innermost disposition within the casing while the wing portion 42 forms the end trim for the casing. As best seen in FIGURES 3 and 7, the wing portion 43 has a grommet 44 fitting in an aperture therein, the grommet preferably being in the form of a brass sleeve headed over opposite side surfaces of the wing portion.

The opening in the grommet 44 is just large enough to slidably receive the respective terminal end of the heating element, and thus the opposite ends of the element are supported and yet are not held against expanding and contracting movements. Opposite portions of the wing 43 are lanced at the juncture with the bight portion 41 and tabs 45, 45 are bent back to provide openings 46, 46 which communicate with respective wire-ways 32. Knockout plugs 47 (FIGURE 3) are provided in the bight portion 41 and wing portion 42 of each closure 40 to pass wiring conduit from a source of electricity or to provide for electrical interconnection of heaters. The bight portion 41 of each closure may have an elongated slot 48 therein for passing a fastening screw (not shown) which secures the heater to a supporting surface, and this bight portion may also have spaced holes 49, 49 to threadedly receive sheet-metal screws 50, 50 for securing the respective closure in position.

To assemble the heater, the heating element 23 is connected to the cover 29 by means of the wire-member 35, and the element is rotated to centralize it on the cover, if necessary. The cover, carrying the heating element, is then slid endwise into the casing 10 through an open end thereof to a position wherein the cover ends are spaced substantially equidistant from the ends of the casing. As an alternative, one of the end closures 40 may be inserted within an end of the casing 10 and secured in place, and the cover member 29 thereafter slid into the opposite end of the casing until it abuts the assembled end closure. Thereafter, the remaining end closure is inserted in the open end of the casing and secured in place. The end closures abut opposite ends of the cover member 29 and restrict longitudinal shifting thereof. Also, the end closures form terminal boxes to house the conductors and any connections thereto. After all electrical connections have been made, including threading of conductors through the wire-ways 32, where desired, and fastening screws disposed through the slots 48, the plates 19 are connected to close the terminal boxes. The cover member 29 has a series of elongated slots 51 at the juncture between its central portion 30 and marginal wings 31, 31 to assist in air circulation and to thus keep the cover 20 cool.

In view of the foregoing, it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. An electric heater assembly comprising an elongated housing having a longitudinally extending intermediate portion with integral, longitudinally extending, opposed marginal portions joined thereto by respective integral, longitudinally extending connection portions, said housing marginal portions being disposed on the same side of said housing intermediate portion and extending toward but being separated from each other to provide therebetween a longitudinally extending opening in said housing and said housing connecting portions being separated by said housing intermediate portion and in turn separating the latter from said housing marginal portions, an elongated closure member within said housing and closing said housing opening, said closure member being shorter than said housing and having a longitudinally extending intermediate portion and integral, longitudinally extending opposed marginal portions projecting transversely of and to one side of said closure member intermediate portion and said closure member marginal portions having longitudinal sliding engagement with respective housing marginal portions for assembly purposes and said closure member marginal portions spacing said closure member intermediate portion from said housing marginal portions and said housing intermediate portion, end closure members removably disposed within said housing at respective ends thereof and limiting relative longitudinal movement between said housing and said closure member by abutment with respective ends of the latter, each end closure member having a pair of walls spaced longitudinally of said housing and facing walls of respective end closure members each having an aperture formed therein, and an elongated, tubular sheathed electric resistance heating element of a length greater than said closure member but less than said housing, said element being disposed between and in spaced relation from said closure member and housing intermediate portions and such element having a portion intermediate its ends secured to said housing closure member and respective end portions slidably projecting through the apertures in respective end closure member walls and terminating between the spaced walls aforesaid of respective end closure members.

2. An electric heater assembly, comprising an elongated housing of C-shaped cross-section and apertured for the escape of heat from therewithin, said housing including a longitudinally extending front wall and a pair of opposed marginal walls joined to and extending from respective sides of said front wall, terminal ends of respective marginal walls being formed to extend toward each other to define an elongated back opening for said housing which is spaced rearwardly from said front wall and is of less width than the spacing of said opposed walls, an elongated closure member disposed within said housing and spanning said opposed marginal walls and having opposite sides fitting against the inner surfaces of the same to transversely locate said closure member within said housing, said closure member closing said housing back opening and the engagement of at least one of said opposite closure member sides with its respective marginal wall is at a point spaced forwardly of the respective terminal end, such side having an extension directed rearwardly toward and substantially in engagement with said respective terminal end to cooperate with the inner surface thereof and with the inner surface of said respective marginal wall to define a longitudinally extending opening providing a way for conductor wires, and an elongated heating element carried by and extending lengthwise of said closure member, said element extending from the inner surface of said closure member and disposed within the housing in spaced relation from the inner surface of said front wall, said latter wall protecting said heating element against unintentional contact.

3. An electric heater assembly, comprising an elongated housing of C-shaped cross-section and apertured for the escape of heat from therewithin, said housing including a longitudinally extending front wall and a pair of opposed marginal walls joined to and extending from respective sides of said front wall, terminal ends of respective marginal walls being formed to extend toward each other to define an elongated back opening for said housing which is spaced rearwardly from said front wall and is of less width than the spacing of said opposed walls, an elongated closure member disposed within said housing and spanning said opposed marginal walls and having opposite sides fitting against the inner surfaces of the same to transversely locate said closure member within said housing, said closure member closing said housing back opening, and an elongated rectilinear heating element of the sheathed type carried by and extending lengthwise of said closure member, said element extending from the inner surface of said closure member and disposed within the housing in spaced relation from the inner surface of said front wall, said latter wall protecting said heating element against unintentional contact, only a medial portion of said heating element being connected to said closure member, and opposite end portions of said heating element being supported by said housing for longitudinal sliding movement to provide for expansion and contraction of the sheath of said element.

4. An electric heater assembly, comprising an elongated housing of C-shaped cross-section and apertured for the escape of heat from therewithin, said housing including a longitudinally extending front wall and a pair of opposed marginal walls joined to and extending from respective sides of said front wall, terminal ends of respective marginal walls being formed to extend toward each other to define an elongated back opening for said housing which is spaced rearwardly from said front wall and is of less width than the spacing of said opposed walls, an elongated closure member disposed within said housing and spanning said opposed marginal walls and having opposite sides fitting against the inner surfaces of the same to transversely locate said closure member within said housing, said closure member closing said housing back opening, an elongated heating element of the sheathed type carried by and extending lengthwise of said closure member, said element extending from the inner surface of said closure member and disposed within the housing in spaced relation from the inner surface of said front wall, said latter wall protecting said heating element against unintentional contact, and end closures for the opposite longitudinal ends of said housing, each end closure comprising a first wall substantially the outline of the transverse end space within said housing, said first wall being closely fitted to said housing at said end space, and each end closure further comprising an additional wall inwardly of said first wall and slidably supporting a respective end of said heating element for longitudinal adjustment of the latter.

References Cited in the file of this patent

UNITED STATES PATENTS

| | | |
|---|---|---|
| 1,849,595 | Shaw | Mar. 15, 1932 |
| 2,369,803 | Sardeson | Feb. 20, 1945 |
| 2,475,180 | Fitch | July 5, 1949 |
| 2,651,504 | Gundrum et al. | Sept. 8, 1953 |
| 2,756,319 | Hatch | July 24, 1956 |
| 2,792,771 | Burwen | May 21, 1957 |
| 2,824,722 | Brinen | Feb. 25, 1958 |
| 2,835,478 | Bemish | May 20, 1958 |
| 2,899,529 | Calhoun | Aug. 11, 1959 |
| 2,951,928 | Gialanella | Sept. 6, 1960 |
| 3,051,816 | Knoll et al. | Aug. 28, 1962 |

FOREIGN PATENTS

| | | |
|---|---|---|
| 180,086 | Great Britain | May 25, 1922 |
| 516,258 | Great Britain | Dec. 28, 1939 |